April 24, 1945.   S. GUARNASCHELLI   2,374,195
VALVE
Filed Dec. 18, 1942
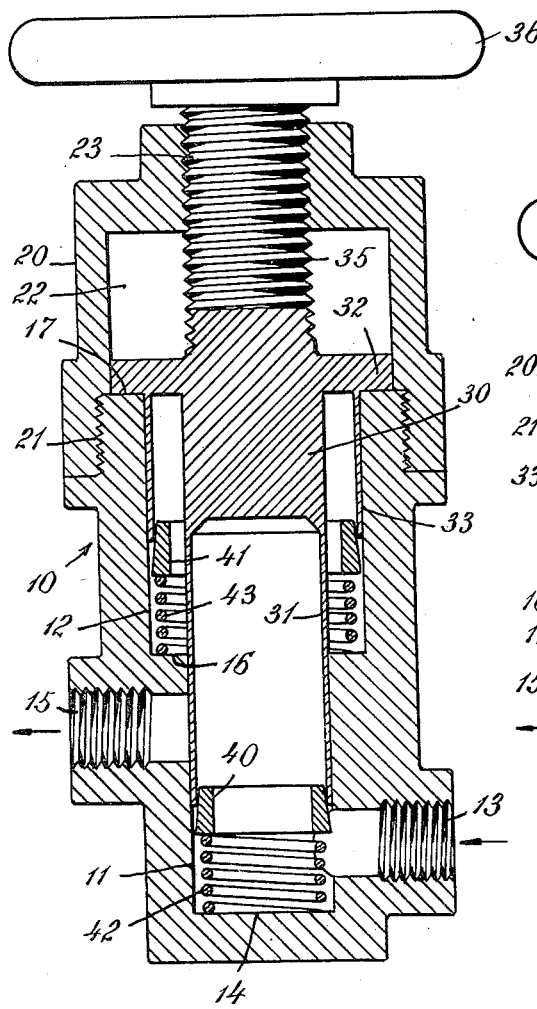
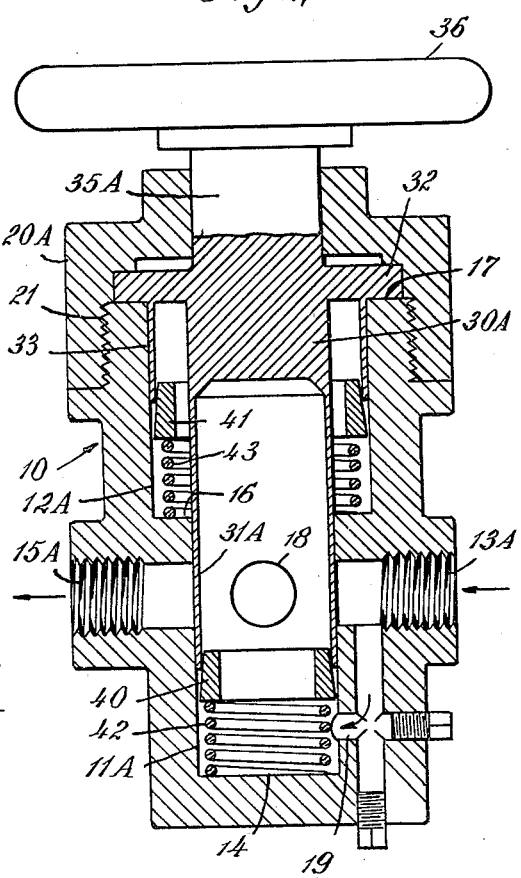
INVENTOR
Stephen Guarnaschelli
BY
E. W. Marshall
ATTORNEY Patented Apr. 24, 1945

2,374,195

UNITED STATES PATENT OFFICE 2,374,195

VALVE

Stephen Guarnaschelli, Mount Vernon, N. Y., assignor to Packless Metal Products Corporation, New Rochelle, N. Y., a corporation of New York Application December 18, 1942, Serial No. 469,426

10 Claims. (Cl. 251—65)

This invention relates to a valve of novel construction and its object is to utilize the principle disclosed in Patent No. 2,301,038 issued November 3, 1942, reissued May 11, 1943, as Re. 22,309, to prevent leakage therein. More specifically its object is to provide a multiple seal in a valve to reduce leakage to a minimum. A further object is to provide a valve which requires no packing.

These and other objects of the invention will appear in the following specification in which valves of different types will be shown and described and the novel features of the invention will be set forth in the claims.

Referring to the drawing:

Figure 1 is a sectional elevation of a valve which is made according to and embodies my invention;

Fig. 2 is a similar view of another type of valve which also embodies the invention.

In Fig. 1 10 designates the body of the valve. This is constructed to form two internal rigid cylindrical surfaces 11 and 12 of different diameters and disposed one above the other. 13 is an intake passage leading into the chamber within the cylinder 11 which is closed at the bottom as shown at 14. 15 is an outlet passage above the intake port leading from the same chamber. The body is constructed to form a shoulder 16 between the cylindrical surfaces 11 and 12 and a transverse seat 17 at its upper end.

20 is a cap affixed to the upper end of the body 10 as by being screwed thereon, as shown at 21. This cap forms a chamber 22. Its upper end has an internally threaded bore 23.

30 is a movable member, the lower end of which is open to form a thin cyilndrical wall or sleeve 31 which is slightly larger than the diameter of the surface 11. When the valve is closed this wall closes the outlet passage 15. 32 is an annular flange in the chamber 22 from which depends another thin cylindrical wall or sleeve 33 which is slightly larger than the diameter of the surface 12. The sleeves 31 and 33 are sprung or forced into seating relation to the surfaces 11 and 12 but are longitudinally movable over these surfaces. The pressure of fluid within the valve forces the thin wall 31 into sealing engagement with the surface 11. If any fluid under pressure escapes into the space between the surface 12 and the adjacent part of member 30, it will force the sleeve 33 into sealing engagement with the surface 12. This pressure sealing is important, especially as it keeps the valve leak-tight even after considerable wear on its parts. Furthermore, the lower surface of flange 32 on the seat 17 forms another seal when the valve is closed.

The lower end of the sleeves are also expanded when the valve is closed by collars 40, 41 which have curved or conical surfaces arranged to enter the ends of the sleeves 31, 33 respectively. These collars are held in position and pressed upwardly by springs 42, 43 seated on the end 14 of member 10 and on the shoulder 16.

The foregoing description relates to the valve when closed. The upper part of the member 30 forms an externally threaded post 35 which extends upwardly through the cap 20 and engages the threads 23 therein. 36 is a handle by means of which the member 30 is rotated and thus moved horizontailly to open and close the port 15.

The same sealing principle is shown in Fig. 2 in which the connection between the intake passage 13A and the outlet passage 15A is controlled by transverse ports 18 in the sleeve 31A which are brought into or out of alinement with the inlet and outlet passages by a partial rotation of the member 30A. The cylindrical surfaces 11A and 12A are similar to the surfaces 11 and 12. The other parts of the valve shown in Fig. 2 are similar to those shown in Fig. 1 except that the openings through the top of the cap 20A and the post 35A are unthreaded and an auxiliary passage 19 is provided in the body 10A to admit fluid under pressure from the intake passage 13A into the inside of the sleeve 31A when the ports 18 are out of alinement with the inlet and outlet passages. The intake may enter the cylinder 11A directly in which case but one port 18 will be required and no auxiliary pressure passage needed.

It will be understood that the invention is capable of modifications and that changes in the construction and in the arrangement of the various cooperating parts may be made within the spirit and scope and I intend no limitations other than those expressed in the following claims.

What I claim is:

1. A valve comprising a thick walled rigid body having a cylindrical bore therein, intake and outlet passages leading to said bore, and a solid member having a thin walled circumferentially continuous resilient sleeve extending therefrom into tight engagement with said bore and movable therein to control communication between said passages, whereby any pressure of fluid in the bore will be exerted on the inside of the sleeve to maintain said tight engagement.

2. A valve comprising a thick walled rigid body having a cylindrical bore therein, intake and outlet passages leading to said bore, and a solid member having a thin walled circumferentially continuous resilient sleeve extending therefrom into tight engagement with said bore and movable longitudinally therein to control communication between said passages, whereby any pressure of fluid in the bore will be exerted on the inside of the sleeve to maintain said tight engagement.

3. A valve comprising a thick walled rigid body having a cylindrical bore therein, intake and outlet passages leading to said bore, and a solid member having a thin walled circumferentially continuous resilient sleeve extending therefrom into tight engagement with said bore and rotatable therein, an opening in the sleeve arranged to control communication between said passages, whereby any pressure of fluid in the bore will be exerted on the inside of the sleeve to maintain said tight engagement.

4. A valve comprising a thick walled rigid body having a cylindrical bore therein, intake and outlet passages leading to said bore, and a solid member having a thin walled circumferentially continuous resilient sleeve extending therefrom into tight engagement with said bore and movable therein to control communication between said passages, the outside diameter of said sleeve slightly exceeding the inside diameter of said bore, whereby any pressure of fluid in the bore will be exerted on the inside of the sleeve to maintain said tight engagement.

5. A valve comprising a thick walled rigid body having a plurality of cylindrical bores therein of different diameters, intake and outlet passages leading to one of said bores and a solid movable member having a plurality of thin walled circumferentially continuous resilient sleeves extending therefrom into tight engagement with said bores, one of said sleeves being arranged to control communication between said passages, whereby any pressure of fluid in the bores will be exerted on the inside of the sleeves to maintain said tight engagement.

6. A valve comprising a thick walled rigid body having a plurality of cylindrical bores therein of different diameters, intake and outlet passages leading to one of said bores and a solid movable member having a plurality of thin walled circumferentially continuous resilient sleeves extending therefrom into tight engagement with said bores, the outside diameter of said sleeves slightly exceeding the inside diameter of said bores, one of said sleeves being arranged to control communication between said passages, whereby any pressure of fluid in the bores will be exerted on the inside of the sleeves to maintain said tight engagement.

7. A valve comprising a thick walled rigid body having a plurality of cylindrical bores therein of different diameters and a flat surface normal to the axis of the bores, intake and outlet passages leading to said bores and a movable member having a plurality of thin walled circumferentially continuous resilient sleeves extending therefrom into tight engagement with said bores, one of said sleeves being arranged to control communication between said passages, whereby any pressure of fluid in the bores will be exerted on the inside of the sleeves to maintain said tight engagement, said movable member having a flange adapted to seat on said flat surface.

8. A valve comprising a thick walled rigid body having a cylindrical bore therein, intake and outlet passages leading to said bore, and a solid member having a thin walled circumferentially continuous resilient sleeve extending therefrom into tight engagement with said bore and movable therein to control communication between said passages, whereby any pressure of fluid in the bore will be exerted on the inside of the sleeves to maintain said tight engagement, and mechanical means for exerting an expanding pressure on the end of the sleeve.

9. A valve comprising a thick walled rigid body having a cylindrical bore therein, intake and outlet passages leading to said bore, a solid member therein having a thin walled circumferentially continuous resilient sleeve extending therefrom into tight engagement with said bore and movable therein to control communication between said passages, the outside diameter of said sleeve slightly exceeding the inside diameter of said bore, whereby any pressure of fluid in the bore will be exerted on the inside of the sleeve to maintain said tight engagement, and mechanical means for exerting an expanding pressure on the end of the sleeve.

10. A valve comprising a thick walled rigid body having a plurality of cylindrical bores therein of different diameters, intake and outlet passages leading to one of said bores, a solid movable member having a plurality of thin walled circumferentially continuous resilient sleeves extending therefrom into tight engagement with said bores, one of said sleeves being arranged to control communication between said passages, whereby any pressure of fluid in the bores will be exerted on the inside of the sleeves to maintain said tight engagement, and resiliently actuated means for exerting an expanding pressure on the ends of the sleeves.

STEPHEN GUARNASCHELLI.